(12) United States Patent  
Euler et al.

(10) Patent No.: US 8,844,006 B2  
(45) Date of Patent: Sep. 23, 2014

(54) AUTHENTICATION OF SERVICES ON A PARTITION

(75) Inventors: Keith S. Euler, Richardson, TX (US); Russell O Craig, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 147 days.

(21) Appl. No.: 13/121,662

(22) PCT Filed: Sep. 30, 2008

(86) PCT No.: PCT/US2008/078210  
§ 371 (c)(1),  
(2), (4) Date: Mar. 29, 2011

(87) PCT Pub. No.: WO2010/039118  
PCT Pub. Date: Apr. 8, 2010

(65) Prior Publication Data  
US 2011/0179476 A1 Jul. 21, 2011

(51) Int. Cl.  
*G06F 7/04* (2006.01)  
*G06F 15/16* (2006.01)  
*G06F 17/30* (2006.01)  
*H04L 29/06* (2006.01)  
*G06F 21/44* (2013.01)

(52) U.S. Cl.  
CPC .................................. *G06F 21/445* (2013.01)  
USPC ............................................................ 726/6

(58) Field of Classification Search  
CPC ....................................................... G06F 21/10  
USPC ................................................................ 726/6  
See application file for complete search history.

(56) References Cited

U.S. PATENT DOCUMENTS 6,915,393 B2 * 7/2005 Collins et al. ................. 711/153  
7,412,705 B2 8/2008 Misra  
(Continued)

FOREIGN PATENT DOCUMENTS

| CN | 101159553 | 4/2008 |
| EP | 1182557 | 2/2002 |
| KR | 10-2006-0114855 | 11/2006 |

OTHER PUBLICATIONS

International Search Report and Written Opinion, dated Apr. 27, 2009, 11 pages.

(Continued)

*Primary Examiner* — Dant Shaifer Harriman

(57) ABSTRACT

Embodiments of the disclosure describe systems and methods for authenticating services running on a partition. In this regard, one embodiment of a system for authenticating a service includes a partition including a list of authorized services, and a service running on the partition; and a management processor in communication with the partition, wherein the management processor is configured to generate credentials for the service running on the partition if the service is listed in the list of authorized services.

16 Claims, 5 Drawing Sheets

(56) References Cited

U.S. PATENT DOCUMENTS

| | | | |
|---|---|---|---|
| 7,451,219 B2* | 11/2008 | Brey et al. | 709/225 |
| 7,900,242 B2* | 3/2011 | Malinen et al. | 726/6 |
| 2003/0172272 A1* | 9/2003 | Ehlers et al. | 713/170 |
| 2005/0108395 A1 | 5/2005 | Brey | |
| 2007/0016801 A1 | 1/2007 | Bade et al. | |
| 2007/0094719 A1 | 4/2007 | Scarlata | |
| 2007/0118878 A1 | 5/2007 | Sastry et al. | |
| 2008/0101276 A1 | 5/2008 | Huang et al. | |
| 2008/0250486 A1* | 10/2008 | Gibson et al. | 726/9 |
| 2009/0064346 A1* | 3/2009 | Larsson et al. | 726/29 |
| 2010/0011408 A1* | 1/2010 | Bhattacharyya et al. | 726/1 |
| 2011/0145907 A1* | 6/2011 | Chua | 726/7 |

OTHER PUBLICATIONS

Agarwal V et al: An information model for metering and accounting. Network Operations and Management Symposium, 2004. NOMS 2004. IEEE/IFI P Seoul, Korea, Apr. 19-23, 2004 Piscataway NJ USA. vol. 1, Apr. 19, 2004, pp. 541-554 XP010712702.

* cited by examiner

US 8,844,006 B2

AUTHENTICATION OF SERVICES ON A PARTITION

BACKGROUND

Many systems (e.g., blade servers or cellular servers) utilize partitions, which separate the system into individual sections, to allow for the operation of multiple operating systems within the system. Partitions include two major categories: soft partitions and hard partitions. Hard partitions are implemented at the board level by separating the system into physically independent partitions, which isolate the multiple operating systems both logically and electrically. Soft partitions are implemented at the processing core level by allocating server resources (e.g., CPU and memory usage) to each partition, which provides functional, but not electrical, isolation of the multiple operating systems.

A partition may have various services running within it. Services operating within the partition may need to request information and/or configuration changes from other partitions of the system. In the past, these requests were executed without security domain access controls or logging the requests. However, with the increased awareness of system security, authentication of the service is needed before authorizing execution of a request and/or logging an audit trail entry.

SUMMARY

Embodiments of the present disclosure are related to systems and methods for authenticating services operating on a partition.

Briefly described, one embodiment, among others, comprises a system for authenticating a service. The system comprises a partition configured to execute the service; a list of authorized services associated with the partition; and a management processor in communication with the partition, the management processor configured to generate credentials for the service if the service is listed in the list of authorized services.

Another embodiment, among others, comprises a method for authenticating a service running on a partition. The method comprises initiating a request for credentials by the service; verifying that the service is listed in an authorized services group associated with the partition; and if the service is listed in the authorized services group, sending the request for credentials to a management processor.

Another embodiment, among others, comprises a computer readable storage medium comprising a program for authentication of services. The program when executed by a computer processor causing the processor to perform the steps of initiating a request for credentials by the service, the request including a unique service identifier corresponding to the service; verifying that the service is listed in the authorized services group; and if the service is listed in the authorized services group, sending the request for credentials to a management processor.

Other systems, methods, features, and advantages of the present disclosure will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
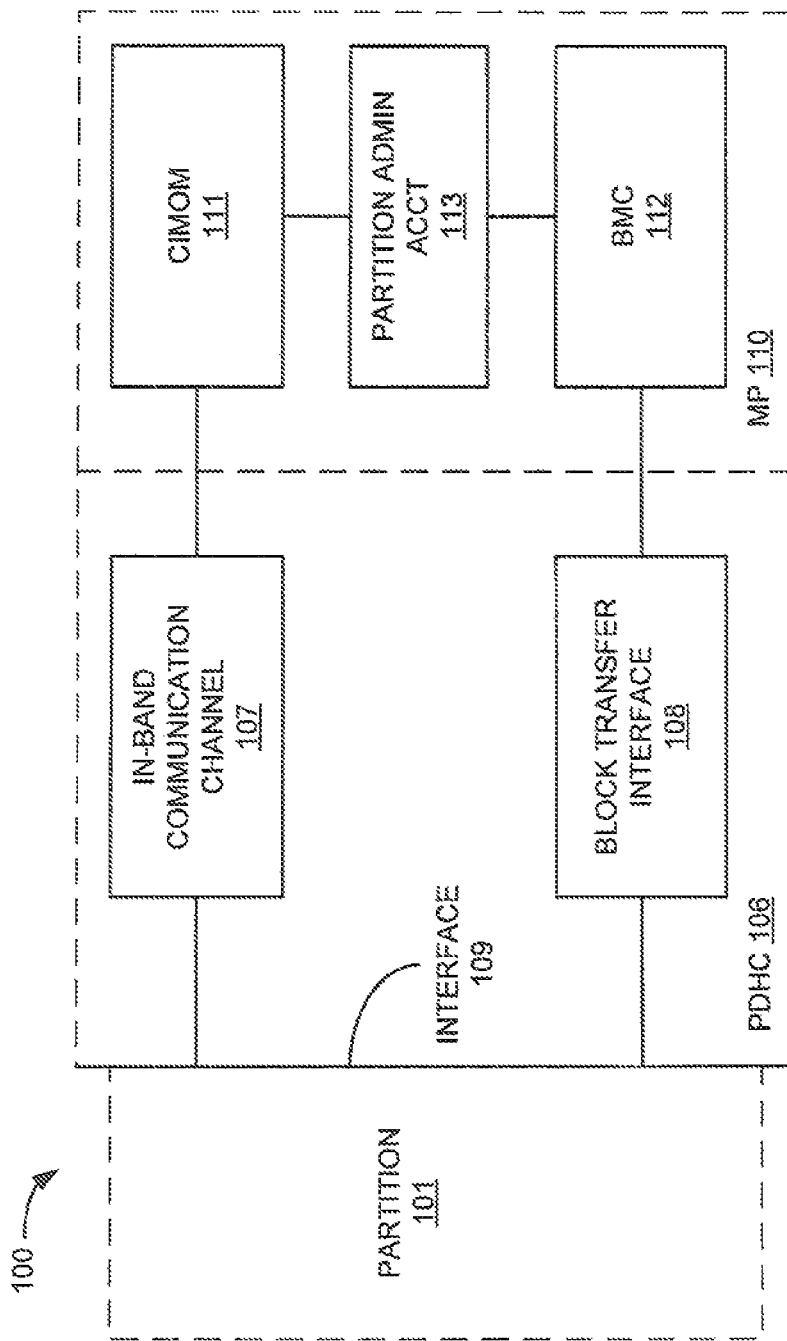
FIG. 1 is an illustration of a partitioned system in accordance with one embodiment of the present disclosure.

Disclosed herein are various embodiments of methods and systems related to authentication of services running on a partition. Reference will now be made in detail to the description of the embodiments as illustrated in the drawings, wherein like reference numbers indicate like parts throughout the several views.

When a partition is created within a system, the management processor (MP) of the system will instruct processor dependent hardware controller (PDHC) to activate one or more interfaces associated with the partition being configured. FIG. 1 is an illustration of a partitioned system 100 in accordance with one embodiment of the present disclosure. A partitioned system may include as many partitions as is desired. In the non-limiting embodiment of FIG. 1, a single partition 101 is shown for illustrative purposes only. Partition 101 communicates with PDHC 106 via interface 109. The PDHC 106 includes an in-band communication channel 107 and a block transfer (BT) interface 108 associated with partition 101, which communicate with a common information model object manager (CIMOM) 111 and a baseboard management controller (BMC) 112, respectively. The CIMOM 111 and BMC 112 are included in MP 110. The partition administrative account 113, which administers partition 101, is also in communication with CIMOM 111.

Figure 2:
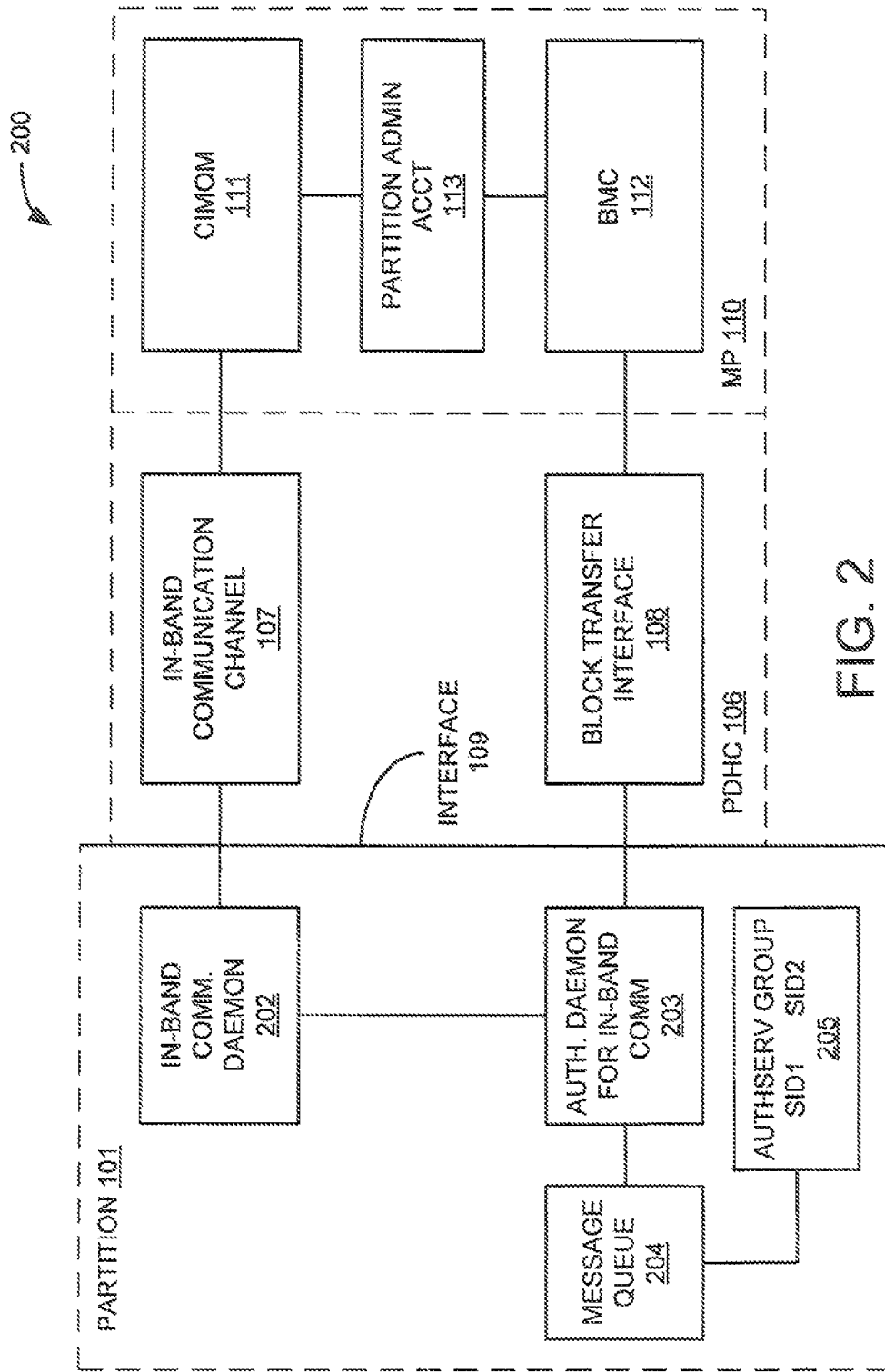
FIG. 2 is an illustration of the partitioned system of FIG. 1 after installation of management tools included in an exemplary authentication system in accordance with one embodiment of the present disclosure.

FIG. 2 is an illustration of the partitioned system of FIG. 1 after installation of management tools included in an exemplary authentication system 200. Installation of management tools on partition 101 may take place simultaneously with creation of the partition 101, or afterwards. In a HPUX environment, for instance, software for the authentication system 200 may be installed along with the operating system (OS). In a Windows, OpenVMS, Linux, or other environment, installation of an appropriate embodiment of an authentication system 200 may be separate from the OS install on the partition. With any OS, installation of updates and additional services may be supported. Installation and updates in any environment may involve administrative or root access to the partition. The particular OS that is installed on partition 101 may use its OS-specific file system permissions to control access to interface 109.

In the embodiment of FIG. 2, the management tools installed in partition 101 include an in-band communication daemon 202, an authorization daemon for in-band communication 203, a message queue 204, and an authorized services (AuthServ) group 205. In-band communication daemon 202 communicates via interface 109 with in-band communication channel 107. The authorization daemon for in-band communication 203 communicates via message queue 204 with AuthServ group 205, and via interface 109 with block transfer interface 108. AuthServ group 205 includes a list of service identifiers (SIDs). A unique SID is associated with a service running on a partition. In the non-limiting embodiment of FIG. 2, SID1 and SID2 are shown for illustrative purposes only. The number of SIDs associated with AuthServ group 205 may be different in other embodiments. The list of SIDs in AuthServ group 205 is populated by the partition administrative account 113, and the listed SIDs correspond to services that are authorized to run on the partition 101. Such services may include, but are not limited to, software applications such as, for example, payroll applications, global workload managers, or value added applications.

Embodiments of the in-band communication daemon 202 may send requests for computing resources for MP resources from services running on partition 101 to MP 110. In some embodiments, the in-band communication daemon 202 is prohibited from initiating requests between partition 101 and MP 110. For example, daemon 202 may only forward requests between services on partition 101 and the MP 110. Therefore, in such embodiments, the in-band communication daemon 202 is not required to have its own access credentials to access the MP 110.

Embodiments of the authorization daemon for in-band communication 203 may be used to request credentials for a service from the MP 110 over interface 109 and BT interface 108. Embodiments of interface 109 may include an intelligent platform management interface (IPMI), which requires administrative user level access to connect across the IPMI. In such embodiments, authorization daemon 203 may use a specially defined IPMI request to talk to the MP 110. Authorization daemon 203 may also use message queue 204 to communicate with services.

Embodiments of AuthServ group 205 may be used to control access to the message queue 204. Message queue 204 is used by the authorization daemon for in-band communication 203 to request credentials from the MP 110. Creation, addition, modification, or removal of SIDs from AuthServ group 205 may require administrator level access on the partition 101. The AuthServ group 205 may also specify the level of access that a specific service is authorized to have to resources of MP 110.

Figure 3:
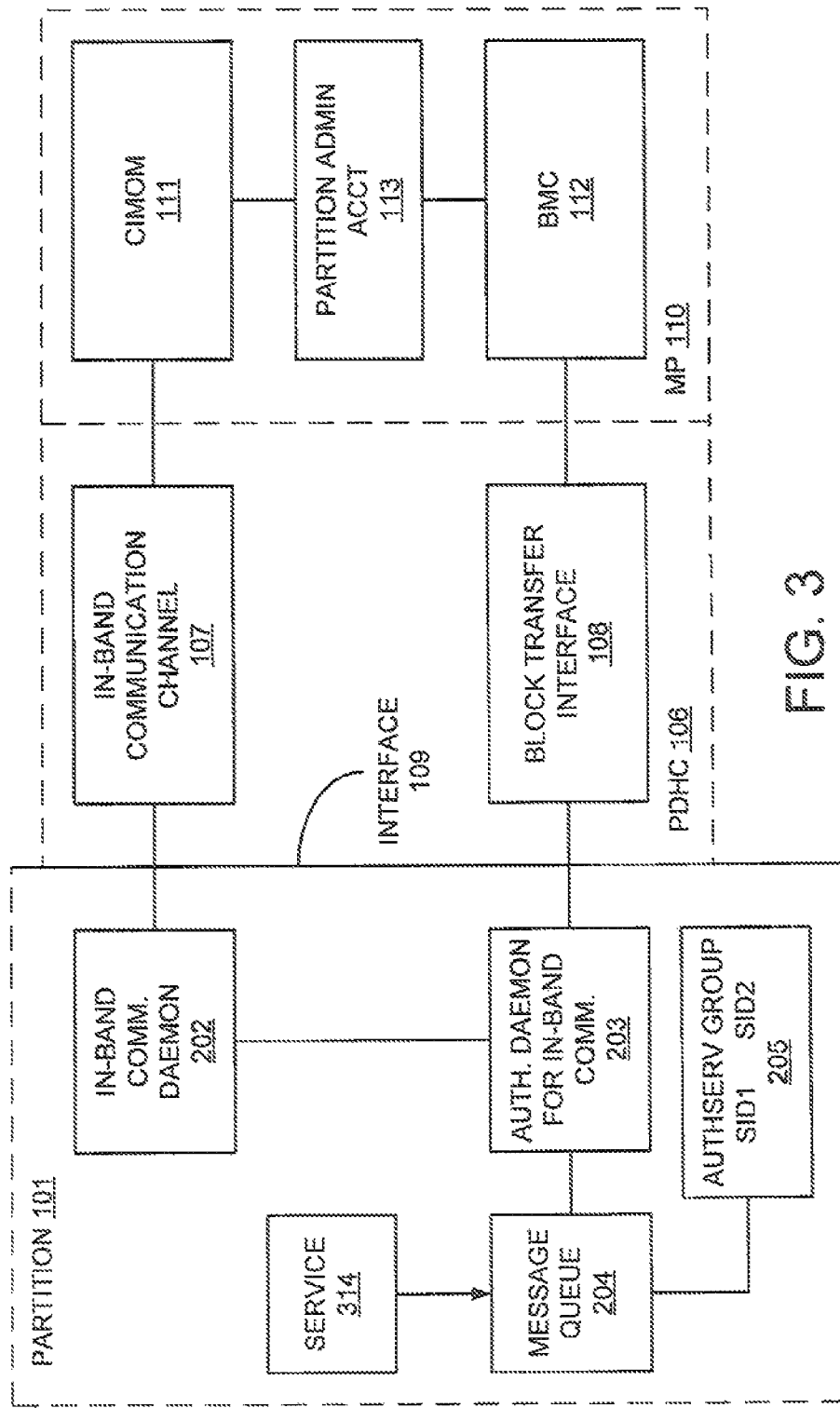
FIG. 3 is an illustration of the authentication system of FIG. 2 at the time of service startup in accordance with one embodiment of the present disclosure.

FIG. 3 is an illustration of an authentication system of FIG. 2 at the time of service startup in accordance with one embodiment of the present disclosure. While a single service 314 is shown in FIG. 3, any appropriate number of services may run on partition 101. Service 314 runs under a unique service identifier (SID) on partition 101. Services authorized by partition administrative account 113 have their SIDs listed in the AuthServ group 205. At the time of startup, service 314 may not have credentials to access MP 110. Service 314 therefore sends a request for credentials via message queue 204 to the authorization daemon for in-band communication 203. The message queue 204 will determine the validity of the request based on the SIDs listed in the AuthServ group 205. Only services with SIDs listed in AuthServ group 205 may access MP 110 to make credential requests. The message queue 204 may also enforce file system permissions defined in AuthServ group 205.

Upon receiving a request for credentials, MP 110 will check to see if credentials for service 314 on partition 101 exist. If the credentials exist, the MP 110 returns the credentials to the authorization daemon for in-band communication 203 via interface 109. The authorization daemon for in-band communication 203 then passes the credentials back to the service 314. If the credentials do not currently exist, the MP 110 creates credentials with a role specifically defined for the service 314 making the request. The special role may be defined by the partition administrative account 113 in AuthServ group 205 to tailor access privileges to MP 110 specifically for service 314; the administrator therefore may limit access by service 314 to only required privileges, as may be appropriate.

In one exemplary embodiment, among others, credentials may include a random, unique password issued by the MP 110 for the service 314. In some embodiments, the password may be associated With, for example, the service's SID, or with a unique account created by the MP 110 for the service 314. If the MP 110 creates an account for the requesting service, the account name is passed back to the service along with the password; alternatively, the service 314 may use its SID as its account name. In other embodiments, the password may comply with configured password length requirements and may consist of both upper and lower case letters and numbers if it is desired by the administrator. In addition, some embodiments, among others, may have a minimum password length (e.g., 8 or more characters).

In alternative embodiments of FIG. 3 that include multiple partitions, separate instances of a service may be running on different partitions. Each separate instance of a service may require separate credentials unique to the service's home partition. The source partition of a request may be identified to the MP 110 as part of the authentication and authorization process, to ensure that the requesting service is authorized to run, on the partition from which it is making a request. If an SID does not exist for the requesting service, unique credentials may be generated by MP 110 for the requesting service and used to authenticate requests for MP 110 resources from the requesting service.

Figure 4:
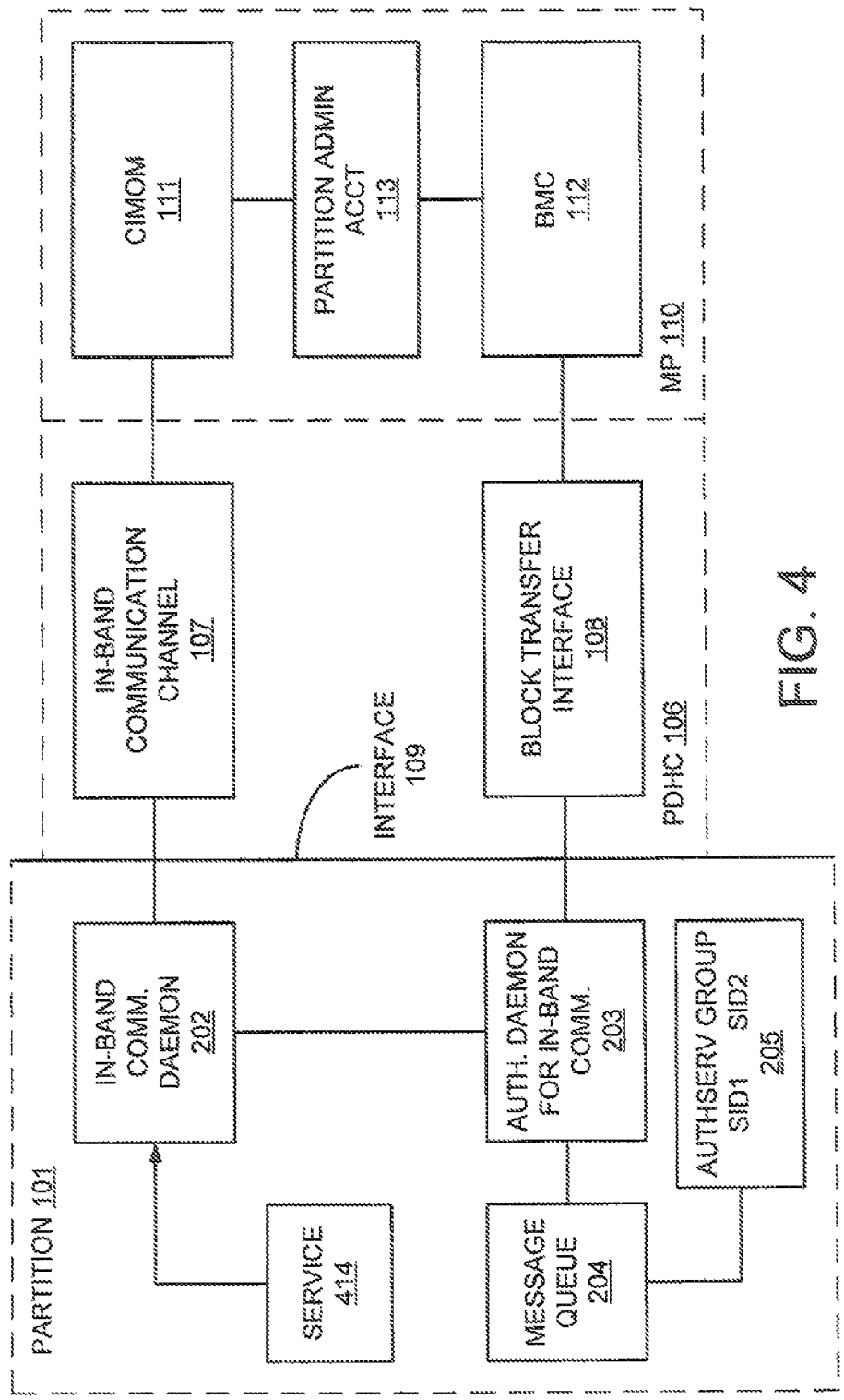
FIG. 4 is an illustration of the authentication system of FIG. 2 including a service making a request for management processor resources in accordance with one embodiment of the present disclosure.

FIG. 4 is an illustration of an authentication system of FIG. 2 including a service 414 making a request for MP resources in accordance with one embodiment of the present disclosure. Referring to FIG. 4, once service 414 has acquired credentials from MP 110 through the authorization daemon for in-band communication 203, service 414 is ready to communicate with MP 110 over the in-band communication channel 107 via the in-band communication daemon 202 and interface 109. Embodiments of the in-band communication channel 107 or daemon 202 may support basic HTTP authentication. When service 414 initiates a request to MP 110, service 414 may place its authentication information, including, for example, a SID and/or other credentials from MP 110 in an authentication field of an HTTP header of the request as specified for HTTP basic authentication. The authentication information in the authentication field may be used to authenticate the service 414 and to check the permissions defined for the service's role in the partition administrative account 113 before the request is executed by MP 110. Embodiments of the authentication system may use any appropriate method for passing and authenticating the credentials of the service 414 requesting computing resources from MP 110.

Figure 5:
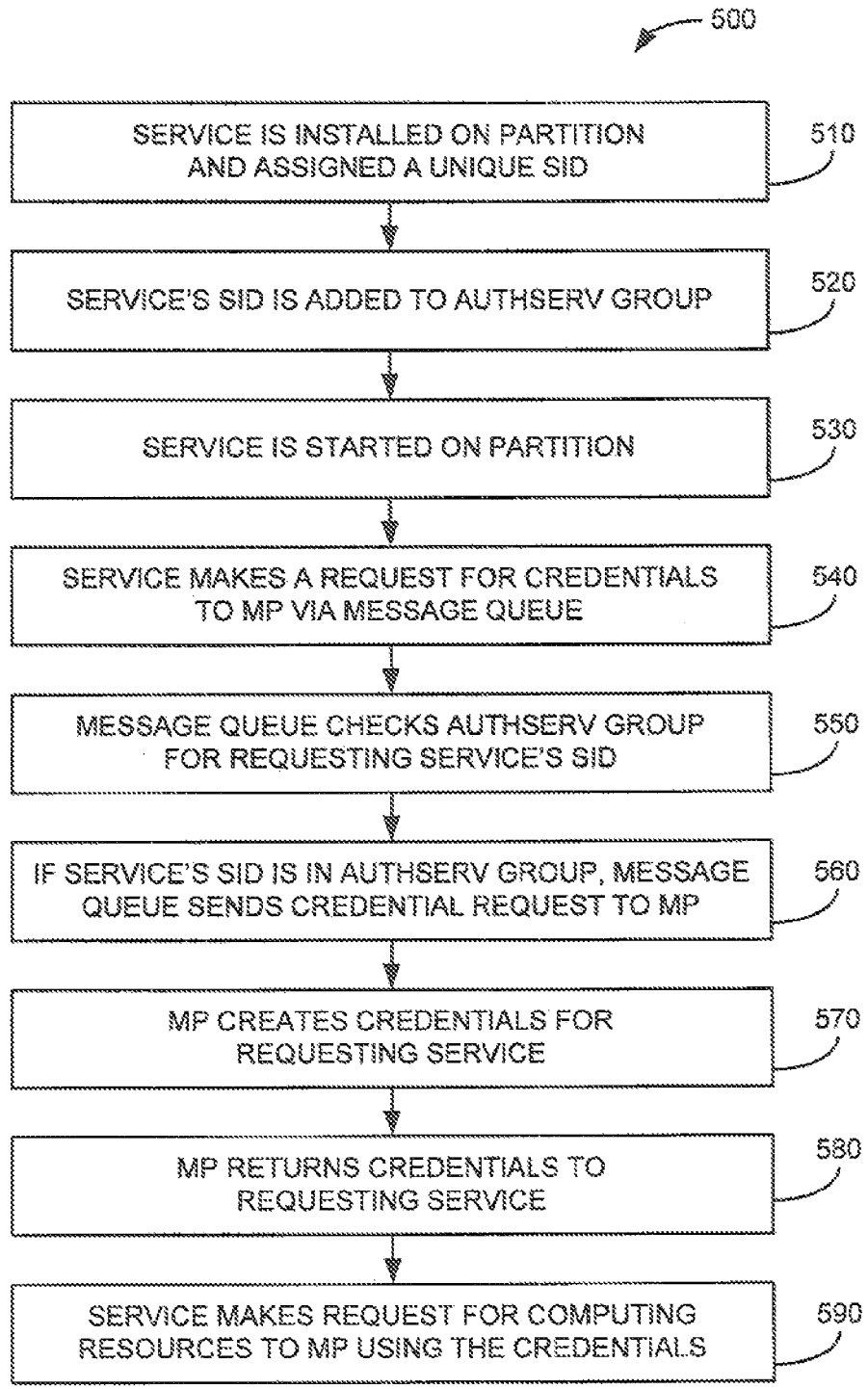
FIG. 5 is a flow chart illustrating an exemplary method for authentication of services running on a partition in accordance with one embodiment of the present disclosure.

FIG. 5 is a flow chart illustrating an exemplary method 500 for authentication of services running on a partition in accordance with one embodiment of the present disclosure. In block 510, a service is installed on a partition. At that point, the service is assigned a unique SID. In some embodiments, the unique service ID may be assigned by an administrator. In block 520, the service's unique SID is added to an AuthServ group on the partition by an entity that has root access to the partition. In other embodiments, the SID may be added by an administrator. In block 530, the service is started. In block 540, the service connects to an authorization daemon to make a request to the MP for credentials; the request is sent via a message queue. In block 550, the message queue checks the SIDs listed in the AuthServ group to see whether the requesting service is listed. If the service is listed in the AuthServ group, the message queue sends the request for credentials to the management processor via an interface in block 560, and the management processor creates credentials specific to that service on that partition in block 570. The management processor then returns these credentials over the interface to the service in block 580. The service continues execution in block 590, and the service makes all requests to the management processor using the credentials that were issued in block 570. The management processor may uniquely identify and authenticate the service on its specific partition, and, in some embodiments, log the service's resource requests.

Some embodiments, among others, may allow for expiration dates for credentials. In such embodiments, if a service doesn't restart for a period greater than a specified maximum credential lifetime, the service's credentials will expire. In one embodiment, among others, the maximum credential lifetime may be specified by an administrator. In other embodiments, the maximum credential lifetime may be a predefined value. If expiration of the credential occurs, a request to the management processor made by the service will fail. If the failure is due to an expired credential, the service once again connects to an authorization daemon and requests updated credentials. As long as the service is listed in the AuthServ group, the new credential request succeeds and the service automatically receives new updated credentials without additional user or administrator intervention.

Embodiments of the present disclosure can be implemented in hardware, software, firmware, or a combination thereof. In various embodiment(s), system components are implemented in software or firmware that is stored in a memory and that is executed by a suitable instruction execution system. If implemented in hardware, as in some embodiments, system components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Software components may comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In addition, the scope of the present disclosure includes embodying the functionality of one or more embodiments in logic embodied in hardware or software-configured mediums.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are, intended to be included herein within the scope of this disclosure and the present invention and protected by the following claims

The invention claimed is:

1. A system for authenticating a service, comprising:
a partition configured to execute the service;
a list of authorized services associated with the partition; and
a management processor in communication with the partition, the management processor configured to generate credentials for the service if the service is listed in the list of authorized services, the credentials facilitating a request by the service for use of computing resources of the management processor by the service.

2. The system of claim 1, further comprising a message queue for sending a request for credentials from the service to the management processor.

3. The system of claim 2, wherein the message queue is configured to verify that the service is listed in the list of authorized services before sending the request for credentials to the management processor.

4. The system of claim 1, further comprising an in-band communication daemon for sending a request of the service for management processor resources to the management processor, the request including the credentials for the service.

5. The system of claim 4, wherein the management processor is configured to verify that the request is authorized for the service before executing the request.

6. The system of claim 1, wherein the service requests credentials from the management processor using a unique service identifier corresponding to the service.

7. The system of claim 1, wherein the service comprises an application and wherein wherein the credentials are for use of the computing resources of the management processor by the service independent of other services associated with the partition.

8. A method for authenticating a service running on a partition, the method comprising:
initiating a request for credentials by the service;
verifying that the service is listed in an authorized services group associated with the partition; and
if the service is listed in the authorized services group, sending the request for credentials to a management processor.

9. The method of claim 8, further comprising sending a request to the management processor for computing resources for the service, the request including credentials for the service received from the management processor in response to the request.

10. The method of claim 9, wherein the credentials include a random password generated by the management processor.

11. The method of claim 9, wherein the credentials expire after a specified amount of time.

12. The method of claim 11, further comprising, if the credentials have expired, automatically sending a new request for credentials to the management processor.

13. The method of claim 8, further comprising:
creating a partition;
installing the authorized services group on the partition;
assigning a unique service identifier to the service; and
in response to assigning the unique service identifier, adding the unique service identifier to the authorized services group.

14. A non-transitory computer readable storage device comprising a program for authentication of services, the program when executed by a computer processor causing the processor to perform the steps of:
initiating a request for credentials by the service, the request including a unique service identifier corresponding to the service;
verifying that the service is listed in an authorized services group; and
if the service is listed in the authorized services group, sending the request for credentials to a management processor.

15. The non-transitory computer readable storage device of claim 14, wherein the program causes the processor to further perform the step of receiving credentials for the service from the management processor in response to the request.

16. The non-transitory computer readable storage device of claim 15, wherein the program causes the processor to further perform the step of sending a request to the management processor for computing resources for the service, the request including the unique service identifier and the credentials.

* * * * *

UNITED STATES PATENT AND TRADEMARK OFFICE
CERTIFICATE OF CORRECTION

| | |
|---|---|
| PATENT NO. | : 8,844,006 B2 |
| APPLICATION NO. | : 13/121662 |
| DATED | : September 23, 2014 |
| INVENTOR(S) | : Keith S. Euler et al. |

It is certified that error appears in the above-identified patent and that said Letters Patent is hereby corrected as shown below:

In the Claims

In column 6, line 56, in Claim 7, before "the credentials" delete "wherein".

Signed and Sealed this
Eighteenth Day of August, 2015

Michelle K. Lee
*Director of the United States Patent and Trademark Office*